(12) United States Patent
van Dijk et al.

(10) Patent No.: US 9,660,813 B1
(45) Date of Patent: May 23, 2017

(54) DYNAMIC PRIVACY MANAGEMENT FOR COMMUNICATIONS OF CLIENTS IN PRIVACY-PRESERVING GROUPS

(75) Inventors: Marten Erik van Dijk, Somerville, MA (US); Eyal Kolman, Tel Aviv (IL); Roy Hodgman, Wenham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 43 days.

(21) Appl. No.: 13/431,214

(22) Filed: Mar. 27, 2012

(51) Int. Cl.
 *H04L 9/32* (2006.01)
 *G06F 21/62* (2013.01)
 *H04L 29/06* (2006.01)

(52) U.S. Cl.
 CPC ........ *H04L 9/3255* (2013.01); *G06F 21/6254* (2013.01); *H04L 9/3247* (2013.01); *H04L 63/0853* (2013.01)

(58) Field of Classification Search
 None
 See application file for complete search history.

(56) References Cited

U.S. PATENT DOCUMENTS

| 7,526,651 B2 * | 4/2009 | Arditti Modiano et al. . 713/180 |
| 2009/0055382 A1 * | 2/2009 | Kerschbaum ............ 707/5 |
| 2012/0084669 A1 * | 4/2012 | Flint et al. ............ 715/753 |

OTHER PUBLICATIONS

Stuart Schechter et al Anonymous Authentication of Membership in Dynamic Groups M.Fraklin (Ed): FC'99, LNCS 1648, . 184-195, 1999 Sringer-Verlag Berlin Heidelberg 1999.*
R.L. Rivest et al., "How to Leak a Secret," Proceedings of the 7th International Conference on the Theory and Application of Cryptology and Information Security: Advances in Cryptology—ASIACRYPT, Lecture Notes in Computer Science (LNCS), Dec. 2001, pp. 552-565, vol. 2248, Gold Coast, Australia.
U.S. Appl. No. 12/982,288, filed in the name of J.P. Field et al. on Dec. 30, 2010 and entitled "Distributed Security Information and Event Management System with Application-Injected Remote Components."

* cited by examiner

*Primary Examiner* — Fatoumata Traore
(74) *Attorney, Agent, or Firm* — Ryan, Mason & Lewis, LLP

(57) ABSTRACT

A server is configured to communicate with a group of clients over a network in one embodiment. The server maps the group of clients into a plurality of subgroups of bounded size, communicates to a given one of the clients information identifying the particular subgroup to which that client belongs as well as the other clients in that subgroup. The given client utilizes the communicated information to generate a ring signature over the corresponding subgroup of clients based on the communicated information. The subgroup size may be bounded to a minimum size and a maximum size in accordance with a variable privacy parameter. The server can increase or decrease the value of the parameter in order to provide respective increased or decreased privacy to the clients, by making it respectively more or less difficult to determine which client in a corresponding one of the subgroups produced the received ring signature.

28 Claims, 3 Drawing Sheets

DYNAMIC PRIVACY MANAGEMENT FOR COMMUNICATIONS OF CLIENTS IN PRIVACY-PRESERVING GROUPS

FIELD

Illustrative embodiments of the invention relate generally to the field of cryptography, and more particularly to secure communication techniques.

BACKGROUND

In a cryptographic construct known as a ring signature, a signature is produced by one member in a set or "ring" of possible signers without revealing to the verifier which member actually produced the signature. More specifically, a ring signature allows a user to choose any set of possible signers that includes himself, and to sign a message by using his secret key and the public keys of the other members of the set, without getting their approval or assistance. A ring signature is therefore distinct from a standard group signature, in that a group signature generally requires the prior cooperation of the members of the set and also leaves each member vulnerable to later identification by a group manager.

Unlike group signatures, ring signatures have no group managers, no setup procedures, no revocation procedures, and no coordination among the members. The verifier only needs to know the public keys of the ring members in order to verify the ring signature. Furthermore, ring signatures can be constructed using simple computations, e.g., AES-Hash computations combined with a trap-door permutation such as RSA encryption. For additional details, see Ronald L. Rivest, Adi Shamir and Yael Tauman, "How to Leak a Secret," Proceedings of the 7th International Conference on the Theory and Application of Cryptology and Information Security: Advances In Cryptology, pp. 554-567, Springer-Verlag, June 2001, which is incorporated by reference herein.

As indicated above, ring signatures are privacy-preserving constructs, in that neither the verifier nor any other entity reading the ring signature can determine which member of the set of possible signers actually signed the message. However, there remains a need for improvements in privacy management relating to ring signatures and similar cryptographic constructs. For example, the members of the set of possible signers of a ring signature generally want the highest possible level of privacy, which may conflict with the legitimate goal of the verifier to perform certain analytics that provide value to the verifier while also preserving the privacy of the members at a reasonable level.

SUMMARY

Illustrative embodiments of the invention provide techniques for dynamic management of privacy-preserving group communications between clients and a server, or between other types of processing devices, in a communication system.

In one embodiment, a server is configured to communicate with a group of clients over a network. The server maps the group of clients into a plurality of subgroups of bounded size, communicates to a given one of the clients information identifying the particular subgroup to which that client belongs as well as the other clients in that subgroup. The given client utilizes the communicated information to generate a ring signature over the corresponding subgroup of clients based on the communicated information. The subgroup size may be bounded to a minimum size and a maximum size in accordance with a variable privacy parameter.

By way of example, the variable privacy parameter may comprise a positive integer u, and the size of each subgroup may be restricted to at least a minimum size $u+1$ and at most a maximum size $2u+1$. The server can increase the value of the parameter u in order to provide increased privacy to the clients by making it more difficult to determine which particular client in a corresponding one of the subgroups produced the received ring signature. Similarly, the server can decrease the value of the parameter u in order to provide decreased privacy to the clients by making it less difficult to determine which particular client in a corresponding one of the subgroups produced the received ring signature.

In another embodiment, a given client of a group of clients obtains a message to be signed using a ring signature. The given client selects a subgroup of the group of clients, with the subgroup including the given client, generates a ring signature for the message over the selected subgroup of clients, and communicates the ring signature in a manner that allows a receiving server to identify the selected subgroup. The selection of the subgroup of clients may comprise randomly selecting a subgroup of $u+1$ clients from a group of n clients. The server receiving the ring signature processes the signature to obtain the message and to identify the selected subgroup of $u+1$ clients over which the ring signature was generated, and utilizes public keys of the $u+1$ clients to verify the ring signature.

One or more of the illustrative embodiments overcome the above-noted drawbacks of conventional practice. For example, by allowing the server in some embodiments or the clients in other embodiments to control the selection of the subgroup over which a ring signature is generated, a wide variety of different privacy policies may be implemented in an efficient manner. As a result, a better balance between potentially divergent privacy goals of the server and clients can be achieved.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model. Also, the terms "client" and "server" as used herein are intended to be broadly construed so as to encompass, for example, respective processing devices that are configured to generate a ring signature and to verify that ring signature, respectively.

Figure 1:
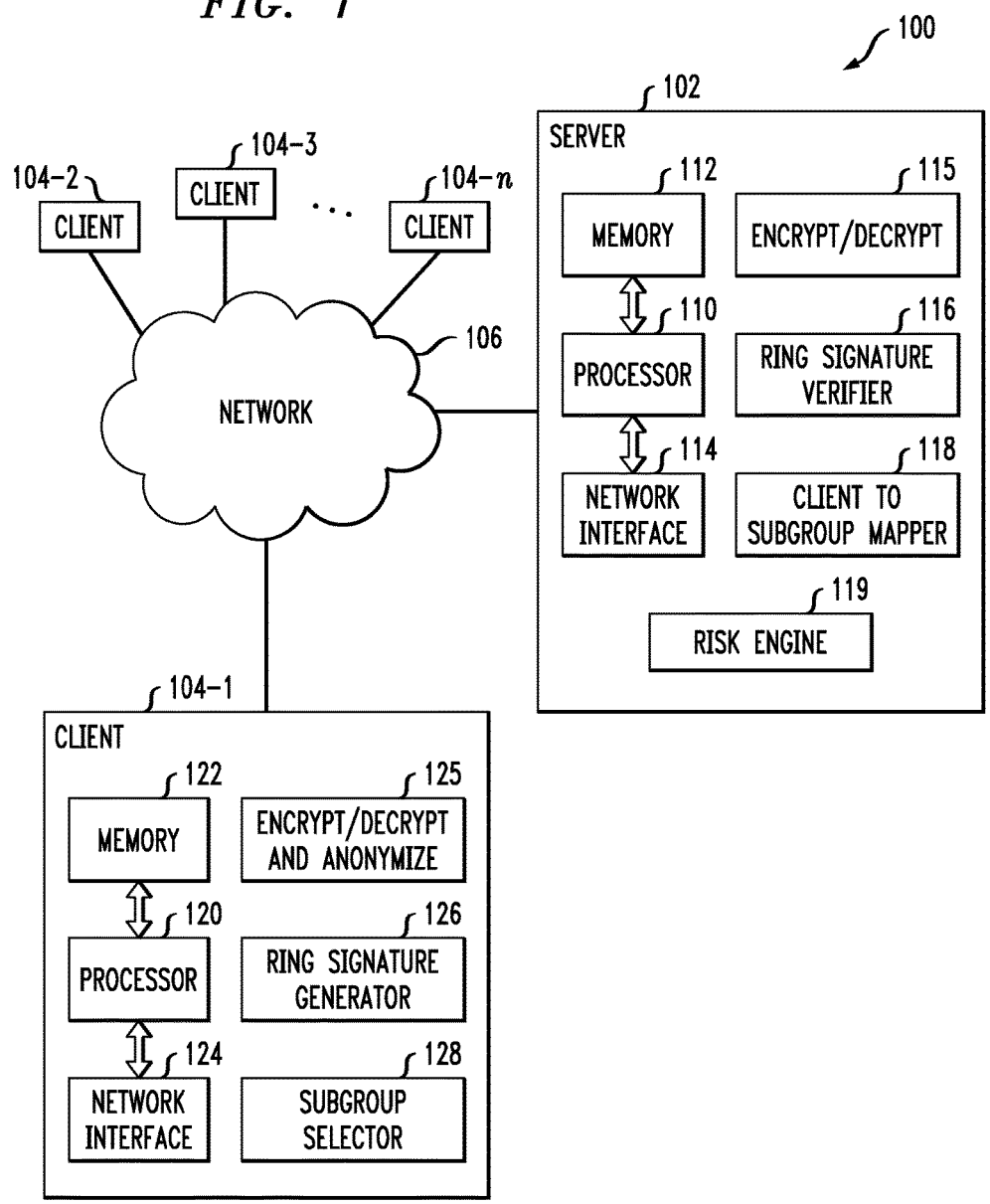
FIG. 1 is a block diagram of a communication system that incorporates dynamic privacy management for clients in a privacy-preserving group in an illustrative embodiment of the invention.

FIG. 1 shows a communication system 100 that incorporates dynamic privacy management functionality in an illustrative embodiment. The system 100 comprises a server 102 that is configured to communicate with a plurality of clients 104-1, 104-2, . . . 104-n, over a network 106.

The server 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The system 100 in the present embodiment implements one or more processes for dynamic privacy management functionality. Examples of such processes performed by server 102 and one of the clients 104 will be described in conjunction with FIGS. 2 and 3, respectively, but it is to be appreciated that numerous other types of processes may be used in other embodiments.

In implementing the above-noted dynamic privacy management, the system 100 is configured to permit the group of n clients to be separated into subgroups of bounded size. Such separation into subgroups may be performed by the server 102, as in the FIG. 2 process, or by a given one of the clients 104, as in the FIG. 3 process. Each such subgroup is an example of a privacy-preserving group, in that each client in the subgroup can generate a ring signature for a message to be delivered to the server 102. The server cannot determine which of the clients in the subgroup generated the ring signature.

As will be described in greater detail below, the sizes of the respective subgroups are bounded in accordance with a current value of a variable privacy parameter u, where u is an integer greater than zero. For example, the size of each subgroup may be at least a minimum size $u+1$ and at most a maximum size $2u+1$.

The server 102 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements, and the memory 112, which may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the server 102 is network interface circuitry 114. The network interface circuitry 114 allows the server 102 to communicate over the network 106 with the clients 104, and may comprise one or more conventional transceivers.

The server 102 further includes an encryption/decryption module 115, a ring signature verifier 116, a client to subgroup mapper 118, and a risk engine 119. One or more of these modules 115, 116, 118 and 119 may be implemented at least in part in the form of software that is stored in memory 112 and executed by processor 110.

The risk engine 119 processes feedback from the clients 104, and may perform operations such as correlation and analytics. Thus, for example, information regarding received ring signatures and the corresponding originating subgroups may be provided to the risk engine 119 for processing.

The risk engine 119 may also receive information from other sources. For example, the risk engine may receive information from a security information and event management (SIEM) system, such as that described in U.S. patent application Ser. No. 12/982,288, filed Dec. 30, 2010 and entitled "Distributed Security Information and Event Management System with Application-Injected Remote Components," which is commonly assigned herewith and incorporated by reference herein. An example of a commercially available centralized SIEM system is the enVision® platform commercially available from RSA, The Security Division of EMC Corporation.

A given one of the clients 104-1 in the present embodiment comprises a processor 120 coupled to a memory 122. The processor 120, like processor 110 in server 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the client 104-1 is network interface circuitry 124. The network interface circuitry 124 allows the client 104-1 to communicate over the network 106 with the server 102 and with the other clients 104, and may comprise one or more conventional transceivers.

The client 104-1 further includes an encryption/decryption and anonymization module 125, a ring signature generator 126, and a subgroup selector 128. One or more of these modules 125, 126 and 128 may be implemented at least in part in the form of software that is stored in memory 122 and executed by processor 120.

The other clients 104 of the system 100 are assumed to be configured in a manner similar to that shown for client 104-1 in the figure.

The network 106 may comprise, for example, a wide area network (WAN), a local area network (LAN), a satellite network, a telephone or cable network, or various portions or combinations of these and other types of networks.

It is to be appreciated that the particular set of elements shown in FIG. 1 for providing dynamic privacy management for clients in a privacy-preserving group is presented by way of example, and in other embodiments additional or alternative elements may be used. Thus, another embodiment may include additional instances of server 102, network 106 or set of clients 104. In addition, the functionalities associated with separate elements in the FIG. 1 embodiment, such as elements 115, 116 and 118 in server 102 or elements 125, 126 and 128 of client 104-1, may be combined into a lesser number of elements each of which performs multiple functions.

As noted above, various elements of system 100 such as clients, servers or their associated functional modules may be implemented at least in part in the form of software. Such software is stored and executed utilizing respective memory and processor elements of at least one processing device. Accordingly, the system 100 may include additional or alternative processing platforms, as well as numerous distinct processing platforms in any combination, with each such platform comprising one or more computers, servers, storage devices or other processing devices.

Such processing platforms may include cloud infrastructure comprising virtual machines (VMs) and one or more associated hypervisors. An example of a commercially available hypervisor platform that may be used to implement portions of the communication system 100 is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

The operation of the communication system 100 will now be described in greater detail with reference to the flow diagrams of FIGS. 2 and 3, which illustrate sets of operations performed by the server 102 and the client 104-1 in respective embodiments.

Figure 2:
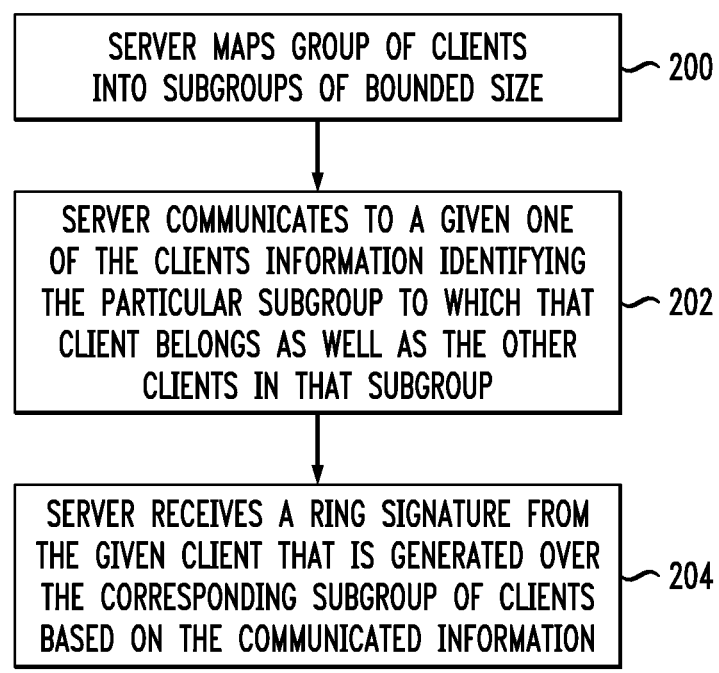
FIG. 2 is a flow diagram of a dynamic privacy management process implemented by a server in the system of FIG. 1.
Figure 3:
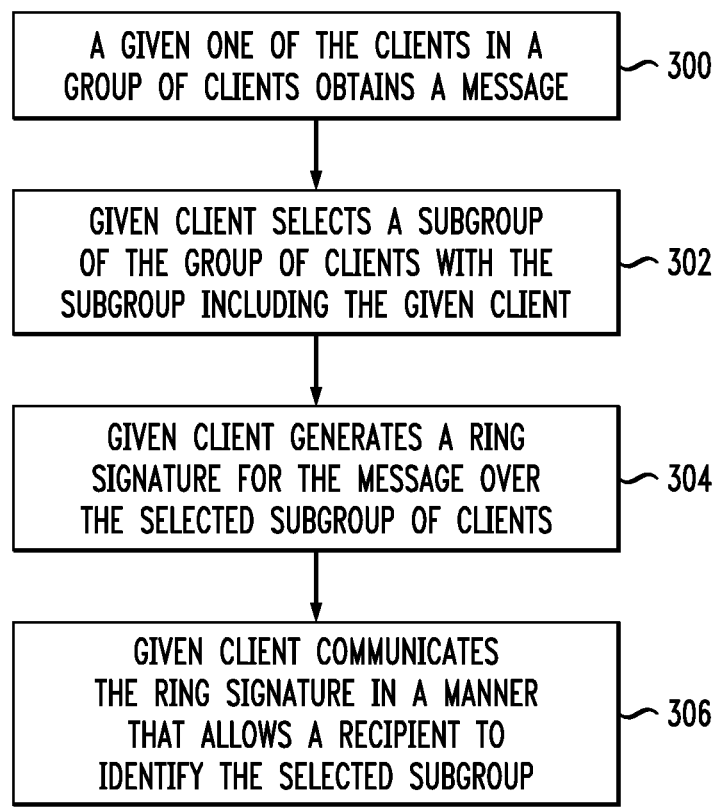
FIG. 3 is a flow diagram of a dynamic privacy management process implemented by a given one of the clients in the system of FIG. 1.

It should be noted that the two illustrative embodiments to be described in FIGS. 2 and 3 are assumed to be separate embodiments, and therefore a given implementation of system 100 may only include one such embodiment. However, various aspects of these embodiments may be combined in other implementations of system 100.

Referring initially to FIG. 2, the process as shown includes steps 200, 202 and 204, which are assumed to be performed by the server 102, although in other embodiments one or more such steps may be implemented at least in part by other system elements.

In step 200, the server 102 maps a group of clients into multiple subgroups each of bounded size. This operation is performed using client to subgroup mapper 118, and may involve separating the n clients 104-1 through 104-$n$ into m subgroups. It will be assumed that this separation into subgroups fully partitions the set of n clients.

As noted above, the respective subgroups are bounded in accordance with a current value of a variable privacy parameter u, where u is an integer greater than zero. The server therefore maps the clients to subgroups so as to ensure that the size of each subgroup is at least a minimum size u+1 and at most a maximum size 2u+1. The privacy parameter u measures privacy leakage and correlation capability, and in the present embodiment is used to define constraints on the number of participants in a privacy-preserving group that can generate ring signatures.

Generally, the server wishes to have smaller u, which makes possible more accurate correlation and therefore improved analytics in the risk engine 119, while the clients wish to have larger u in order to maintain as much of their anonymity as possible. Other types of privacy parameters, as well as combinations of multiple such parameters, can be used in other embodiments.

The server 102 is configured to monitor the number of clients 104 as n varies over time, and to make appropriate adjustments to the subgroups so as to ensure that the size bounds based on parameter u are enforced. The clients 104 may therefore be a variable group, with clients being added to and dropped from the group over time.

Upon identification of a new client to be added to the group of clients, the server 102 selects a particular one of the subgroups, and adds the new client to the selected subgroup. If the addition of the new client to the selected subgroup causes the bounded size to be violated by that subgroup, the server 102 splits the subgroup into multiple smaller subgroups, and communicating to each client associated with one of the multiple smaller subgroups information identifying the particular subgroup to which that client belongs as well as the other clients in that subgroup. Thus, for example, if addition of a new client to the group of clients 104 causes the size of its corresponding subgroup to be increased above 2u+1, the server may split that subgroup into two subgroups each having a size of at least u+1.

Upon identification of an existing client to be removed from the group of clients, the server 102 removes that client from its subgroup. If the removal of the client from the subgroup causes the bounded size to be violated by that subgroup, the server 102 merges the subgroup with at least one other subgroup to form a merged subgroup, and communicates to each client associated with the merged subgroup information identifying the other clients in that subgroup. Thus, for example, if removal of a client from the group of clients 104 causes the size of its corresponding subgroup to be reduced to u, the server may select at least one additional subgroup and merging merge it with reduced-size subgroup to generate a merged subgroup having a size of at least u+1. If the merged subgroup has a size that is greater than the maximum size 2u+1, the server may separate that subgroup into two subgroups of approximately equal size.

The variable privacy parameter u can be adjusted by the server 102 as required to satisfy particular privacy policies within the system 100. For example, the server can increase u in order to provide increased privacy to the clients 104 by making it more difficult to determine which particular client in a corresponding one of the subgroups produced the received ring signature, and can decrease u to provide decreased privacy to the clients by making it less difficult to determine which particular client in a corresponding one of the subgroups produced the received ring signature.

Thus, in the present embodiment, the server 102 can coordinate the addition or removal of participants from a privacy-preserving group, and can modify the size of participant groups to increase or decrease privacy or increase or decrease the ability to correlate messages. Also, the server can institute group size policies related to the types of messages or clients such that different message or client types can be afforded different privacy properties. Accordingly, different client to subgroup mappings can be used for respective different message types or respective different client types.

These and other subgroup and privacy management operations of the server 102 may be performed at least in part by the client to subgroup mapper 118.

It should be noted that the client to subgroup mapper 118 may also be configured assign one or more of the clients 104 to multiple subgroups. This can allow one or more of the clients to generate ring signatures over any selected one of the multiple subgroups to which they are assigned. The subgroup selector 128 implemented in client 104-1 may be used to select from among multiple assigned subgroups available to that client. It will be assumed for the remaining description of FIG. 2 that each client is assigned to only one subgroup.

In step 202, the server 102 communicates to a given one of the clients, assumed to be client 104-1, information identifying the particular subgroup to which that client belongs as well as the other clients in that subgroup. This communication occurs over the network 106 and is encrypted using the encryption/decryption module 115. The communicated information may include, in addition to the information identifying the subgroup and its members, the public keys of the respective subgroup members. However, it is not necessary for the server to transmit the public keys, as the client 104-1 could instead obtain them given the identities of the other clients in the subgroup.

In step 204, the server receives a ring signature from the given client that is generated over the corresponding subgroup of clients based on the communicated information.

Thus, client 104-1 utilizes the information communicated from the server in step 202 to generate a ring signature over the appropriate subgroup of clients in its ring signature generator 126. The ring signature may be generated using the techniques disclosed in the above-cited R. L. Rivest et al. article, or using other ring signature generation techniques known in the art. The client 104-1 communicates the resulting ring signature to the server 102 over the network 106 in encrypted and anonymized form, using its encryption/decryption and anonymization module 125. The anonymization ensures that the server 102 cannot determine, from IP addresses or other information in a given communication received over network 106, which of the clients 104 originated that communication.

The ring signature generated by the client 104-1 is assumed to be a signature on a message. For example, such a message to be transmitted by the client to the server 102 using a ring signature may comprise an indicator of compromise (IOC). The risk engine 119 of server 102 is configured to process such IOC feedback from the subgroups, possibly in combination with other inputs from other sources. The larger the subgroup size, the less correlation and the less useful the feedback information. Accordingly, as indicated above, the server generally wishes to use a small value for privacy parameter u, while the clients wish to use a large value for u such that their anonymity is less compromised.

Although not expressly shown in the figure, the server 102 can verify the received ring signature using its ring signature verifier 116. Verification of the ring signature provides the server with assurance that one of the clients in the corresponding subgroup signed a corresponding message, without allowing the server to determine which client it was that generated the signature.

In the FIG. 2 embodiment, a client belonging to a particularly subgroup trusts the server to transmit the identity of the subgroup to all the other clients that are part of that subgroup. If the server is malicious, then the server may create a unique subgroup per client, such that the ring signature can be mapped to a single client. In order to avoid this, clients may check with their peers that the subgroup structure is what is referred to herein as "u-privacy preserving." In the present embodiment, in which the subgroups fully partition the set of n clients, with each subgroup having a size of at least u+1, the subgroup structure is u-privacy preserving if it can be reduced to a partitioning of the set of n clients, with each subgroup in the partition having a size of at least u+1, by removing subgroups and clients from subgroups.

As indicated previously, the server wants the clients to use ring signatures over small groups, since this leads to improved analytics capability. Therefore, if a received ring signature is over a group with more than 2u+1 clients, then the server may ask the clients to retransmit the message, even though the server cannot identify non-cooperating clients.

Referring now to FIG. 3, the process as shown includes steps 300, 302, 304 and 306, which are assumed to be performed by a given one of the clients 104, and more particularly the client 104-1. Again, in other embodiments one or more such steps may be implemented at least in part by other system elements.

In step 300, the given client 104-1 in the group of n clients 104 obtains a message to be sent to server 102 using a ring signature. For example, client 104-1 may generate the message, or receive it from another source.

In step 302, client 104-1 selects a subgroup of the group of n clients, with the selected subgroup includes itself. This selection operation is performed by the subgroup selector 128 of client 104-1.

The subgroup selection in step 302 may involve randomly selecting a subgroup of u+1 clients from a group of n clients, where u is the above-described privacy parameter.

Such random selection prevents collusion of clients who are in the same subgroup and exclude a single client from their subgroup such that any ring signature produced by the single client can be identified by the colluders. The term "random selection" as used herein is intended to be broadly construed so as to encompass pseudorandom selection.

The goal of the client 104-1 in the random selection is to use a ring signature over u+1 randomly selected clients including itself such that its privacy leakage is minimal given the amount of correlation capability needed by the server. The random selection should therefore be configured such that client 104-1 selects u other clients in a manner that does not reveal the identity of client 104-1.

By way of example, the above-noted random selection may comprise computing hash values h(m∥k), where m in this context denotes the message, and where k is the smallest integer for which h(m∥k) interpreted as u+1 sequences of log n bits represents u+1 distinct clients including the given client.

As a more particular example, randomly selecting the subgroup of u+1 clients from the group of n clients may comprise the following steps:

1. Computing hash values h(m∥i) in $\{0, 1\}^{(u+1)\log n}$, where m denotes the message, where 1≤i≤k, and where k is the smallest integer for which a k×(u+1) log n binary matrix H with rows h(m∥i) has the property that submatrices of respective consecutive sets of log n columns of H each have full row rank. This operation utilizes k=O(log n) hash computations.

2. Selecting a linear combination of rows of H such that the linear combination interpreted as u+1 sequences of log n bits represents u+1 distinct clients including the given client 104-1. This operation utilizes at most u+1 times a k×log n Gaussian elimination.

In this example, $z \in \{0, 1\}^k$ denotes a vector which if multiplied with the matrix H forms the linear combination. In the unlikely event that such a linear combination does not exist, then the client may elect not to transmit the message m at all. It will be assumed for the remainder of the description of FIG. 3 that such a linear combination does exist.

In step 304, client 104-1 generates a ring signature for the message over the selected subgroup of clients, using its ring signature generator 126. Assuming use of the random selection involving computation of hash values h(m∥i) in $\{0, 1\}^{(u+1)\log n}$ as per the immediately preceding example, the client 104-1 signs both the message m and the vector z using the ring signature.

In step 306, client 104-1 communicates the ring signature to a recipient, illustratively the server 102, in a manner that allows the server 102 to identify the selected subgroup such that the server can verify the ring signature.

Again assuming random selection based on computation of hash values h(m∥i) in $\{0, 1\}^{(u+1)\log n}$ as in the above example, the server 102 processes the ring signature received from client 104-1 to obtain message m and vector z, computes the matrix H from message m, computes zH to identify a particular set of u+1 clients, and utilizes public keys of the u+1 clients to verify the ring signature. The public keys of the clients in the randomly-selected subgroup need not be transmitted by the client to the server, as the server can obtain them directly based on its knowledge of the identities of the u+1 clients in the subgroup.

The vector z in this random selection embodiment allows the client 104-1 to signal to the server 102 how to compute a pseudorandom subgroup of u+1 clients that includes client 104-1. An optimal tradeoff between privacy leakage and correlation capability since is provided since each ring signature is over exactly u+1 clients. It should also be noted that this embodiment uses O(log n) hash computations and O(u (log n)$^2$) binary multiplications. Thus, improved computational efficiency is achieved relative to the simpler approach described above in which the client computes hash values h(m||k), where k is the smallest integer for which h(m 1k) interpreted as u+1 sequences of log n bits represents u+1 distinct clients including the given client. This latter approach requires k=O(n/u) hash computations. In either of these two exemplary approaches, any desired value of n can be accommodated.

The particular processing operations and other system functionality described in conjunction with the flow diagrams of FIGS. 2 and 3 are presented by way of illustrative example only, and should not be construed as limiting the scope of the invention in any way. Alternative embodiments can use other types of processing operations for selecting subgroups and generating and verifying ring signatures over those subgroups. For example, the ordering of the process steps may be varied in other embodiments, or certain steps may be performed concurrently with one another rather than serially. Also, the process steps may be repeated periodically, or for each of multiple messages or sets of messages. Additional or alternative process steps may be used in other embodiments.

As one example of such an alternative embodiment, the FIG. 3 embodiment may be modified to use other techniques for random selection of a subgroup of u+1 clients from the group of n clients, as performed by the client 104-1 in step 302. More particularly, the random selection may instead involve the following steps:

1. Computing hash value h(m), where m denotes the message.
2. Seeding a pseudorandom number generator with h(m).
3. Creating a list L of the n clients ordered in their natural order.
4. Using the pseudorandom number generator to shuffle the list L resulting in a shuffled list L'.
5. Partitioning the shuffled list L' into partitions of at least size v, where u+1≤v≤2u+1.
6. Identifying one of the partitions which includes the given client.

Other types of random selection may be performed by the given client 104-1 in other embodiments.

A number of other variants of the FIG. 3 process are also possible.

For example, in another embodiment, the client 104-1 acquires or otherwise obtains message m, calculates subgroups from a hash of the message, identifies one of the subgroups to which it belongs, creates a ring signature based on that group, generates a random nonce, organizes data to send to server 102 as a combination of the message m and the random nonce, signs the data using the ring signature, and encrypts the signed data and the ring signature to send to the server through a mixnet.

Another example will now be described. As in one or more of the previous examples, this example also utilizes a hash function h that maps bit strings to log n bits. Assume there are n clients 104, indexed by the integers 0, 1, 2, . . . , n−1, and further assume that n is a power of 2, such that $2^{\log n}$=n. If a given client j wishes to transmit message m, the client performs the following steps:

1. Client j computes a binary log n×log n matrix M as a function of m, where the matrix M is invertible over a Galois Field GF(2) and counter values are associated with respective rows of M, where each row is equal to a hash of message m concatenated with the counter value associated with that row. The counter values are computed in the following deterministic way:

(a) The first row $r_1$ of M is set to $h(m||c_1)$ with $c_1$ being the smallest integer ≥0 such that $r_1$ is not equal to the all zero row.

(b) The second row $r_2$ of M is set to $h(m||c_2)$, where $c_2$ is the smallest integer greater than $c_1$ such that $r_2$ is not in the linear vector space, over GF(2), generated by $r_1$.

(c) In general, row $r_{t+1}$ of M is set to $h(m||c_{t+1})$, where $c_{t+1}$ is the smallest integer greater than $c_t$ such that $r_{t+1}$ is not in the linear vector space, over GF(2), generated by the row vectors $r_1, r_2, \ldots, r_t$.

At the end of this step an invertible matrix M has been constructed as a function of m. The expected run time of this procedure is O(log n) hash operations and O(log n) Gaussian eliminations over vectors of size log n. Each Gaussian elimination costs at most O((log n)$^2$) binary operations.

2. Client j uses M to map the bit representation of j to a bit representation of some other integer k in {0, . . . , (log n)−1}. We will denote this by M(j)=k. Client j computes b=⌈k/u⌉, where integer b indicates the subgroup ("bucket") index to which j belongs, i.e., k is in bucket B={(b−1) u, . . . , (b−1)u+(u−1)}. The client represents each integer in B as a bit vector and uses the inverse of M to compute the subgroup or ring R={$M^{-1}$(s): s∈B}. It should be noted that j is in R. This step costs u matrix multiplications leading to another O(u (log n)$^2$) binary operations.

3. Client j uses the public keys of the clients in R to sign m together with the bucket index b and a random nonce to avoid replay attacks, and the signed message+bucket index+ random nonce is encrypted with the public key of the server.

The server is able to repeat the construction of M based on m. The bucket index b is used to reconstruct B and combined with the inverse of M the ring R can be reconstructed such that the ring signature can be verified by the server.

The above variant has the property that it is efficient in that it costs O(log n) hash operations and another O((u+log n)(log n)$^2$) binary operations. The scheme also has the desired property that whenever m is signed it is always signed over the same ring. Thus, a message uniquely determines the subgroup over which its ring signature is created.

If the number n of clients is not a power of two, then dummy clients may be added until a power of two is reached. The dummy clients may be indexed by {n, n+1, . . . }. Let u again be the desired privacy parameter. Step 2 above is modified to use a larger privacy parameter u'>u instead of u, and to include an additional final operation of removing the dummy clients from R, that is, to use R intersected with {0, 1, . . . , n−1} instead of R itself, where R' denotes the resulting subgroup or ring. In Step 3, client j only signs message m if R' has size at least u. For u' sufficiently larger than u, the probability that R' has size at least u, and hence, that client j will sign message m, gets closer to 1.

Again, numerous other variants or alternative arrangements are possible.

It is also to be appreciated that dynamic privacy management functionality such as that described in conjunction with the flow diagrams of FIGS. 2 and 3 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1-3 can provide a number of significant advantages relative to conventional practice. For example, by allowing the server 102 in the FIG. 2 embodiment or a given one of the clients 104 in the FIG. 3 embodiment to control the selection of a particular subgroup of clients over which a ring signature is generated, a wide variety of different privacy policies may be implemented in an efficient manner. This allows a better balance to be achieved between potentially divergent privacy goals of the server and clients. The system can enforce designated privacy policies regarding the messages it will accept from privacy-preserving group participants. Additionally or alternatively, the system can manage different types of client to subgroup mappings for different types of messages and for different types of clients.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of communication systems, information technology infrastructure and processing device configurations, subgroup mappings and privacy parameters. The particular process steps and component interactions used to provide privacy management for clients in a privacy-preserving group may be varied in alternative embodiments. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising the steps of:
    mapping a group of clients into a plurality of subgroups of bounded size;
    communicating to a given one of the clients information identifying the particular subgroup to which that client belongs as well as the other clients in that subgroup; and
    receiving a ring signature from the given client that is generated over the corresponding subgroup of clients based on the communicated information;
    wherein the size of a given subgroup is dynamically determined based on a current value of a variable privacy parameter;
    wherein the given subgroup of clients comprises a subgroup of $u+1$ clients randomly selected from a group of n clients, where u and n are integers greater than zero;
    wherein the subgroup of $u+1$ clients is randomly selected from the group of n clients by computing hash values $h(m\|k)$, where m denotes a message, and where k is the smallest integer for which $h(m\|k)$ interpreted as $u+1$ sequences of log n bits represents $u+1$ distinct clients including the given client;
    wherein public keys of the $u+1$ clients are utilized to verify the ring signature;
    wherein the steps are performed by a server that communicates with the clients over a network; and
    wherein each of the server and the clients is implemented as at least one processing device comprising a processor coupled to a memory.

2. The method of claim 1 wherein u is the variable privacy parameter and sizes of the respective subgroups are bounded in accordance with a current value of the variable privacy parameter u.

3. The method of claim 2 wherein the size of each subgroup is at least a minimum size $u+1$ and at most a maximum size $2u+1$.

4. The method of claim 2 wherein if addition of a new client to the group causes the size of its corresponding subgroup to be increased above $2u+1$, splitting that subgroup into two subgroups each having a size of at least $u+1$.

5. The method of claim 2 wherein if removal of a client from the group causes the size of its corresponding subgroup to be reduced to u, selecting at least one additional subgroup and merging it with reduced-size subgroup to generate a merged subgroup having a size of at least $u+1$.

6. The method of claim 5 wherein if the merged subgroup has a size that is greater than the maximum size $2u+1$, separating that subgroup into two subgroups of approximately equal size.

7. The method of claim 2 further comprising the step of increasing the variable privacy parameter u in order to provide increased privacy to the clients by making it more difficult to determine which particular client in a corresponding one of the subgroups produced the received ring signature.

8. The method of claim 2 further comprising the step of decreasing the variable privacy parameter u to provide decreased privacy to the clients by making it less difficult to determine which particular client in a corresponding one of the subgroups produced the received ring signature.

9. The method of claim 1 wherein the mapping step comprises separating the n clients of the group into the plurality of subgroups.

10. The method of claim 1 wherein the communicating step comprises communicating to the given client public keys of respective ones of the other clients in the subgroup.

11. The method of claim 1 wherein the mapping step comprises assigning at least one of the clients to multiple subgroups such that said at least one client can generate a ring signature over any selected one of the multiple subgroups.

12. A method comprising the steps of:
    mapping a group of clients into a plurality of subgroups of bounded size;
    communicating to a given one of the clients information identifying the particular subgroup to which that client belongs as well as the other clients in that subgroup;
    receiving a ring signature from the given client that is generated over the corresponding subgroup of clients based on the communicated information;
    identifying a new client to be added to the group of clients;
    selecting a particular one of the subgroups;
    adding the new client to the selected subgroup; and
    if the addition of the new client to the selected subgroup causes the bounded size to be violated by that subgroup, splitting the subgroup into multiple smaller subgroups, and communicating to each client associated with one of the multiple smaller subgroups information identifying the particular subgroup to which that client belongs as well as the other clients in that subgroup;

wherein public keys of the clients in the corresponding subgroup are utilized to verify the ring signature;

wherein the steps are performed by a server that communicates with the clients over a network; and wherein each of the server and the clients is implemented as at least one processing device comprising a processor coupled to a memory.

13. The method of claim 12 wherein if addition of a new client to the group causes the size of its corresponding subgroup to be increased above $2u+1$, splitting that subgroup into two subgroups each having a size of at least $u+1$, where u is an integer greater than or equal to zero.

14. A method comprising the steps of:
mapping a group of clients into a plurality of subgroups of bounded size;
communicating to a given one of the clients information identifying the particular subgroup to which that client belongs as well as the other clients in that subgroup;
receiving a ring signature from the given client that is generated over the corresponding subgroup of clients based on the communicated information;
identifying one of the clients to be removed from the group of clients;
removing that client from its subgroup; and
if the removal of the client from the subgroup causes the bounded size to be violated by that subgroup, merging the subgroup with at least one other subgroup to form a merged subgroup, and communicating to each client associated with the merged subgroup information identifying the other clients in that subgroup;
wherein public keys of the clients in the corresponding subgroup are utilized to verify the ring signature;
wherein the steps are performed by a server that communicates with the clients over a network; and
wherein each of the server and the clients is implemented as at least one processing device comprising a processor coupled to a memory.

15. The method of claim 14 wherein if removal of a client from the group causes the size of its corresponding subgroup to be reduced to u, selecting at least one additional subgroup and merging it with reduced-size subgroup to generate a merged subgroup having a size of at least $u+1$, where u is an integer greater than or equal to zero.

16. A non-transitory processor-readable storage medium having encoded therein executable code of one or more software programs, wherein the one or more software programs when executed by at least one processing device cause said at least one processing device to perform steps of:
mapping a group of clients into a plurality of subgroups of bounded size;
communicating to a given one of the clients information identifying the particular subgroup to which that client belongs as well as the other clients in that subgroup; and
receiving a ring signature from the given client that is generated over the corresponding subgroup of clients based on the communicated information;
wherein the size of a given subgroup is dynamically determined based on a current value of a variable privacy parameter;
wherein the given subgroup of clients comprises a subgroup of $u+1$ clients randomly selected from a group of n clients, where u and n are integers greater than zero;
wherein the subgroup of $u+1$ clients is randomly selected from the group of n clients by computing hash values $h(m\|k)$, where m denotes a message, and where k is the smallest integer for which $h(m\|k)$ interpreted as $u+1$ sequences of log n bits represents $u+1$ distinct clients including the given client
wherein public keys of the $u+1$ clients are utilized to verify the ring signature;
wherein the steps are performed by a server that communicates with the clients over a network; and
wherein each of the server and the clients is implemented as at least one processing device comprising a processor coupled to a memory.

17. An apparatus comprising:
a server implemented as at least one processing device comprising a processor coupled to a memory;
the server being configured to communicate with a plurality of clients over a network, with each of the clients also being implemented as at least one processing device comprising a processor coupled to a memory;
wherein the server is configured to map a group of the clients into a plurality of subgroups of bounded size, to communicate to a given one of the clients information identifying the particular subgroup to which that client belongs as well as the other clients in that subgroup, and to receive a ring signature from the given client that is generated over the corresponding subgroup of clients based on the communicated information; and
wherein the size of a given subgroup is dynamically determined based on a current value of a variable privacy parameter;
wherein the given subgroup of clients comprises a subgroup of $u+1$ clients randomly selected from a group of n clients, where u and n are integers greater than zero;
wherein the subgroup of $u+1$ clients is randomly selected from the group of n clients by computing hash values $h(m\|k)$, where m denotes a message, and where k is the smallest integer for which $h(m\|k)$ interpreted as $u+1$ sequences of log n bits represents $u+1$ distinct clients including the given client; and
wherein public keys of the $u+1$ clients are utilized to verify the ring signature.

18. The apparatus of claim 17 wherein u is the variable privacy parameter and sizes of the respective subgroups are bounded in accordance with a current value of the variable privacy parameter u.

19. The apparatus of claim 18 wherein the size of each subgroup is at least a minimum size $u+1$ and at most a maximum size $2u+1$.

20. The apparatus of claim 18 wherein if addition of a new client to the group causes the size of its corresponding subgroup to be increased above $2u+1$, that subgroup is split into two subgroups each having a size of at least $u+1$.

21. A method comprising the steps of:
obtaining a message in a given client of a group of clients;
selecting a subgroup of the group of clients wherein the subgroup includes the given client;
generating a ring signature for the message over the selected subgroup of clients;
communicating the ring signature to a recipient in order to allow the recipient to identify the selected subgroup;
wherein the size of a given subgroup is dynamically determined based on a current value of a variable privacy parameter;

wherein the step of selecting the subgroup of clients comprises randomly selecting a subgroup of u+1 clients from a group of n clients, where u and n are integers greater than zero;

wherein the step of randomly selecting the subgroup of u+1 clients from the group of n clients comprises:

computing hash values h(m||k), where m denotes the message, and where k is the smallest integer for which h(m||k) interpreted as u+1 sequences of log n bits represents u+1 distinct clients including the given client;

wherein public keys of the u+1 clients are utilized to verify the ring signature;

wherein the steps are performed by the given client and the given client communicates with a server and other ones of the clients over a network; and wherein each of the server and the clients is implemented as at least one processing device comprising a processor coupled to a memory.

22. A method comprising the steps of:
obtaining a message in a given client of a group of clients;
selecting a subgroup of the group of clients wherein the subgroup includes the given client;
generating a ring signature for the message over the selected subgroup of clients;
communicating the ring signature to a recipient in order to allow the recipient to identify the selected subgroup;
wherein the size of a given subgroup is dynamically determined based on a current value of a variable privacy parameter;
wherein the step of selecting the subgroup of clients comprises randomly selecting a subgroup of u+1 clients from a group of n clients, where u and n are integers greater than zero;
wherein the step of randomly selecting the subgroup of u+1 clients from the group of n clients comprises:
computing hash values $h(m||i)$ in $\{0,1\}^{(u+1)\log n}$, where m denotes the message, where $1 \leq i \leq k$, and where k is the smallest integer for which a $k \times (u+1) \log n$ binary matrix H with rows h(m||i) has the property that submatrices of respective consecutive sets of log n columns of H each have full row rank; and
selecting a linear combination of rows of H such that the linear combination interpreted as u+1 sequences of log n bits represents u+1 distinct clients including the given client;
wherein public keys of the u+1 clients are utilized to verify the ring signature;
wherein the steps are performed by the given client and the given client communicates with a server and other ones of the clients over a network; and
wherein each of the server and the clients is implemented as at least one processing device comprising a processor coupled to a memory.

23. The method of claim 22 wherein $z \in \{0,1\}^k$ denotes a vector which if multiplied with the matrix H forms the linear combination, and further wherein the step of signing the message using the ring signature comprises signing both message m and vector z using the ring signature.

24. The method of claim 23 further comprising the steps of:
processing the ring signature to obtain message m and vector z;
computing the matrix H from message m; and
computing zH to identify a particular set of u+1 clients.

25. A method comprising the steps of:
obtaining a message in a given client of a group of clients;
selecting a subgroup of the group of clients wherein the subgroup includes the given client;
generating a ring signature for the message over the selected subgroup of clients;
communicating the ring signature to a recipient in order to allow the recipient to identify the selected subgroup;
wherein the size of a given subgroup is dynamically determined based on a current value of a variable privacy parameter;
wherein the step of selecting the subgroup of clients comprises randomly selecting a subgroup of u+1 clients from a group of n clients, where u and n are integers greater than zero;
wherein the step of randomly selecting the subgroup of u+1 clients from the group of n clients comprises:
computing hash value h (m), where m denotes the message;
seeding a pseudorandom number generator with h(m);
creating a list L of the n clients ordered in a natural order;
using the pseudorandom number generator to shuffle the list L resulting in a shuffled list L';
partitioning the shuffled list L' into partitions of at least size v, where $u+1 \leq v \leq 2u+1$; and
identifying one of the partitions which includes the given client;
wherein public keys of the u+1 clients are utilized to verify the ring signature;
wherein the steps are performed by the given client and the given client communicates with a server and other ones of the clients over a network; and
wherein each of the server and the clients is implemented as at least one processing device comprising a processor coupled to a memory.

26. A method comprising the steps of:
obtaining a message in a given client of a group of clients;
selecting a subgroup of the group of clients wherein the subgroup includes the given client;
generating a ring signature for the message over the selected subgroup of clients;
communicating the ring signature to a recipient in order to allow the recipient to identify the selected subgroup;
wherein the size of a given subgroup is dynamically determined based on a current value of a variable privacy parameter;
wherein the step of selecting the subgroup of clients comprises a given client j selecting the subgroup from a group of n clients using the following steps:
computing a binary log n×log n matrix M as a function of message m, where the matrix M is invertible over a designated field and counter values are associated with respective rows of M, where row $r_{t+1}$ of M is set to $h(m||c_{t+1})$, and where $c_{t+1}$ is the smallest integer greater than $c_t$ such that $r_{t+1}$ is not in a linear vector space, over the designated field, generated by the row vectors $r_1, r_2, \ldots, r_t$;
utilizing M to map a bit representation of j to a bit representation of an integer k in $\{0, \ldots, (\log n)-1\}$, where M(j)=k,
computing $b=\lceil k/u \rceil$, where b indicates a subgroup index to which j belongs such that k is in a subgroup $B=\{(b-1)u, \ldots, (b-1)u+(u-1)\}$; and
computing a subgroup $R=\{M^{-1}(s): s \in B\}$;
wherein public keys of the clients in the selected subgroup are utilized to verify the ring signature;
wherein the steps are performed by the given client and the given client communicates with a server and other ones of the clients over a network; and
wherein each of the server and the clients is implemented as at least one processing device comprising a processor coupled to a memory.

27. The method of claim 26 wherein the step of generating the ring signature comprises generating the ring signature over the subgroup R as follows:
  utilizing public keys of the respective clients in subgroup R to generate the ring signature on message m, subgroup index b and a random nonce; and
  encrypting the ring signature with the public key of the server.

28. A non-transitory processor-readable storage medium having encoded therein executable code of one or more software programs, wherein the one or more software programs when executed by at least one processing device cause said at least one processing device to perform steps of:
  obtaining a message in a given client of a group of clients;
  selecting a subgroup of the group of clients wherein the subgroup includes the given client;
  generating a ring signature for the message over the selected subgroup of clients;
  communicating the ring signature to a recipient in order to allow the recipient to identify the selected subgroup;
  wherein the size of a given subgroup is dynamically determined based on a current value of a variable privacy parameter;
  wherein the step of selecting the subgroup of clients comprises randomly selecting a subgroup of u+1 clients from a group of n clients, where u and n are integers greater than zero;
  wherein the step of randomly selecting the subgroup of u+1 clients from the group of n clients comprises:
  computing hash values $h(m\|k)$, where m denotes the message, and where k is the smallest integer for which $h(m\|k)$ interpreted as u+1 sequences of log n bits represents u+1 distinct clients including the given client;
  wherein public keys of the u+1 clients are utilized to verify the ring signature;
  wherein the steps are performed by the given client and the given client communicates with a server and other ones of the clients over a network; and
  wherein each of the server and the clients is implemented as at least one processing device comprising a processor coupled to a memory.

* * * * *

UNITED STATES PATENT AND TRADEMARK OFFICE
CERTIFICATE OF CORRECTION

PATENT NO. : 9,660,813 B1  
APPLICATION NO. : 13/431214  
DATED : May 23, 2017  
INVENTOR(S) : Marten Erik van Dijk et al.

It is certified that error appears in the above-identified patent and that said Letters Patent is hereby corrected as shown below:

In the Specification

Column 6, Line 12, please delete "merging"

Column 8, Line 61, please delete "$\{0,1\}^{(n+1)\log m}$" and insert -- $\{0,1\}^{(u+1)\log n}$ --

In the Claims

Claim 26, Column 16, Line 55, please delete "kin" and insert -- k in --

Signed and Sealed this  
Eighteenth Day of July, 2017

Joseph Matal  
*Performing the Functions and Duties of the*  
*Under Secretary of Commerce for Intellectual Property and*  
*Director of the United States Patent and Trademark Office*